Figure 1:
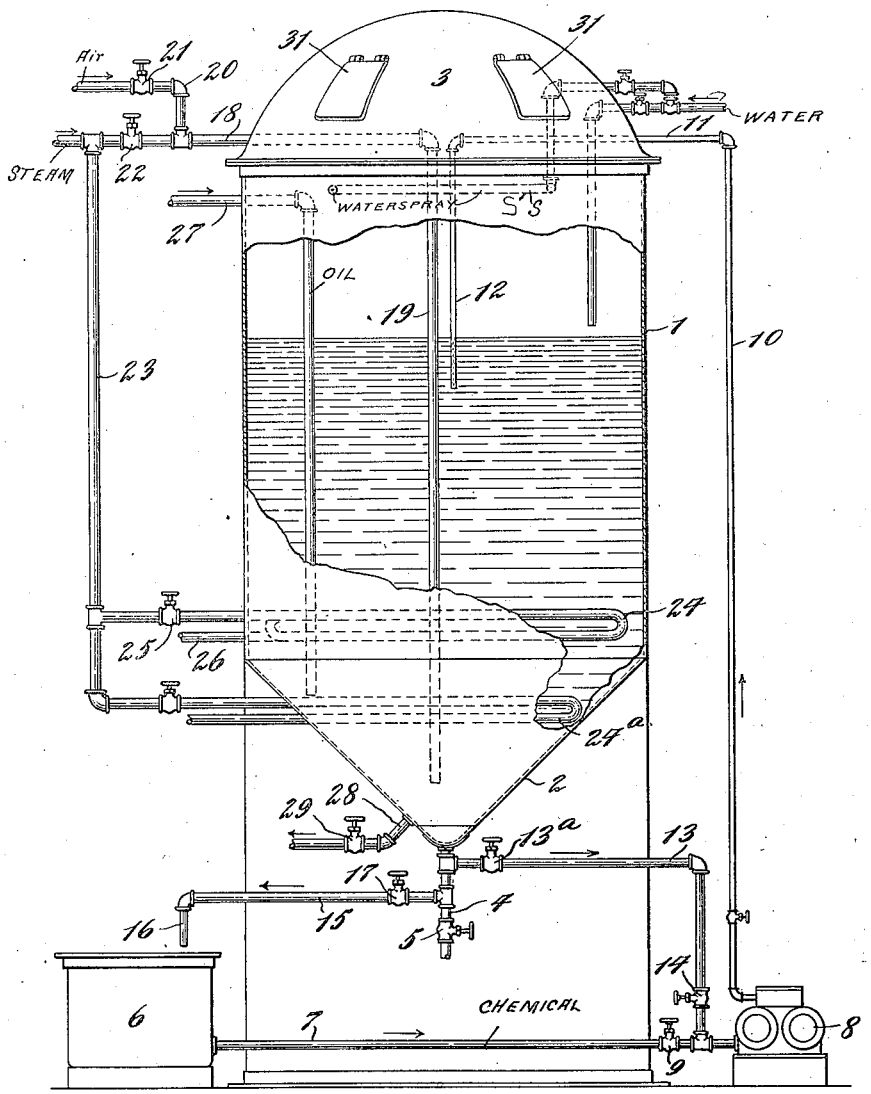

E. B. COBB.
PROCESS OF DESULPHURIZING PETROLEUM OILS.
APPLICATION FILED MAR. 13, 1919.

1,413,005.

Patented Apr. 18, 1922.
2 SHEETS—SHEET 1.

WITNESS:

INVENTOR
Ernest B. Cobb
BY
Gifford & Bull
his ATTORNEYS

E. B. COBB.
PROCESS OF DESULPHURIZING PETROLEUM OILS.
APPLICATION FILED MAR. 13, 1919.

UNITED STATES PATENT OFFICE.

ERNEST B. COBB, OF JERSEY CITY, NEW JERSEY, ASSIGNOR TO STANDARD OIL COMPANY, A CORPORATION OF NEW JERSEY.

PROCESS OF DESULPHURIZING PETROLEUM OILS.

1,413,005.  Specification of Letters Patent.  Patented Apr. 18, 1922.

Application filed March 13, 1919. Serial No. 282,286.

*To all whom it may concern:*

Be it known that I, ERNEST B. COBB, a citizen of the United States, residing at Jersey City, in the county of Hudson and State of New Jersey, have invented certain new and useful Improvements in Processes of Desulphurizing Petroleum Oils, of which the following is a specification.

My invention relates to new and useful improvements in processes for the removal of elementary sulphur from petroleum oils, and my present application is a division in part of my prior application, Serial No. 50,177, which was filed in the Patent Office on or about September 11, 1915, Patent No. 1,300,816, issued April 15, 1919. By elementary sulphur, I mean that sulphur which exists in the oil in its elementary forms, such as brimstone, flowers of sulphur, and all other modifications of elementary sulphur held in physical solution in the oil. The invention is applicable to and covers the removal of elementary sulphur primarily existing as such in the oil, and also elementary sulphur resulting from acid treatment of the oils and other processes of refining and chemical treatment. The presence of elementary sulphur in petroleum oils may be ascertained by first testing the oil by any of the well known tests for sulphuretted hydrogen ($H_2S$) and removing the same by any of the well known processes for this purpose, after which a piece of bright copper or silver is immersed in the oil freed of sulphuretted hydrogen ($H_2S$) and the oil heated; if any elementary sulphur is present it will act to tarnish or blacken the copper or silver. The removal of sulphuretted hydrogen from the test oil is a necessary preliminary because it also darkens copper and silver.

In my Patent No. 1,300,816, referred to, I have described a process for treating petroleum oil with a sulphide to remove the sulphur. In accordance with my present invention, elementary sulphur is removed from petroleum oil in which hydrogen sulphide is present, preferably under agitation, by treating the oil with the hydroxide of either an alkali metal or an alkaline earth metal. The hydroxide forms with the hydrogen sulphide present in the oil sulphides of either the alkali metals or alkaline earth metals, and the sulphides so formed are principally monosulphides, preferably either sodium monosulphide, or calcium monosulphide.

It is well known that higher sulphides of these metals, such as sodium and calcium, exist, and the action of the sulphides formed by the reaction of the alkaline hydroxide with the hydrogen sulphide of the oil, as contemplated by my invention, is to cause the removal of the elementary sulphur apparently by simple addition, the sulphur combining with the low sulphide of the alkali metal or alkaline earth metal, to produce higher sulphides. The process is carried out in the presence of moisture as will later appear.

In case the amount of hydrogen sulphide present in the oil is insufficient when it is all combined with the added hydroxide of an alkali metal, or an alkaline earth metal, as the case may be, to react with and eliminate all of the elementary sulphur present in the oil, then, an alkaline sulphide, preferably an alkaline monosulphide, or sulphides, are added, sufficient in amount to react with and thus eliminate all of the remaining elementary sulphur from the oil.

My invention therefore, contemplates the treatment of petroleum oil, in which hydrogen sulphide is present, with a hydroxide of an alkali metal, or an alkaline earth metal, and in case the sulphides so formed are insufficient to eliminate all of the elementary sulphur from the oil, then additional sulphides, either of the alkali metals, or of the alkaline earth metals, are added.

In referring to alkaline hydroxides, I include hydroxides of the alkali metal group, including ammonia, potassium, sodium, and other elements of said group. In practice I prefer to employ sodium, as it is most abundant and lower in price. Whether the oil is to be treated with alkali metal hydroxides, or whether it is to be treated with hydroxides of the alkaline earth metals, depends to some extent on the character of the oil to be treated, the character of the finished products and the individual preference, but, to a large extent, the alkali metal hydroxides and the hydroxides of the alkaline earth metals are interchangeable. By hydroxides of the alkaline earth metals, I mean hydroxides of the alkaline earth metal group, but in practice I preferably use calcium hydroxide, although I do not necessarily exclude any of the hydroxides of this group. By "alkaline hydroxide" as used herein and in the appended claims, I include the hydroxides of the alkali metal group and the alkaline earth metal group.

The invention is capable of being practiced by a variety of apparatus, but in the accompanying drawings, I have illustrated two types of apparatus which have been successfully used by me.

Figure 2:
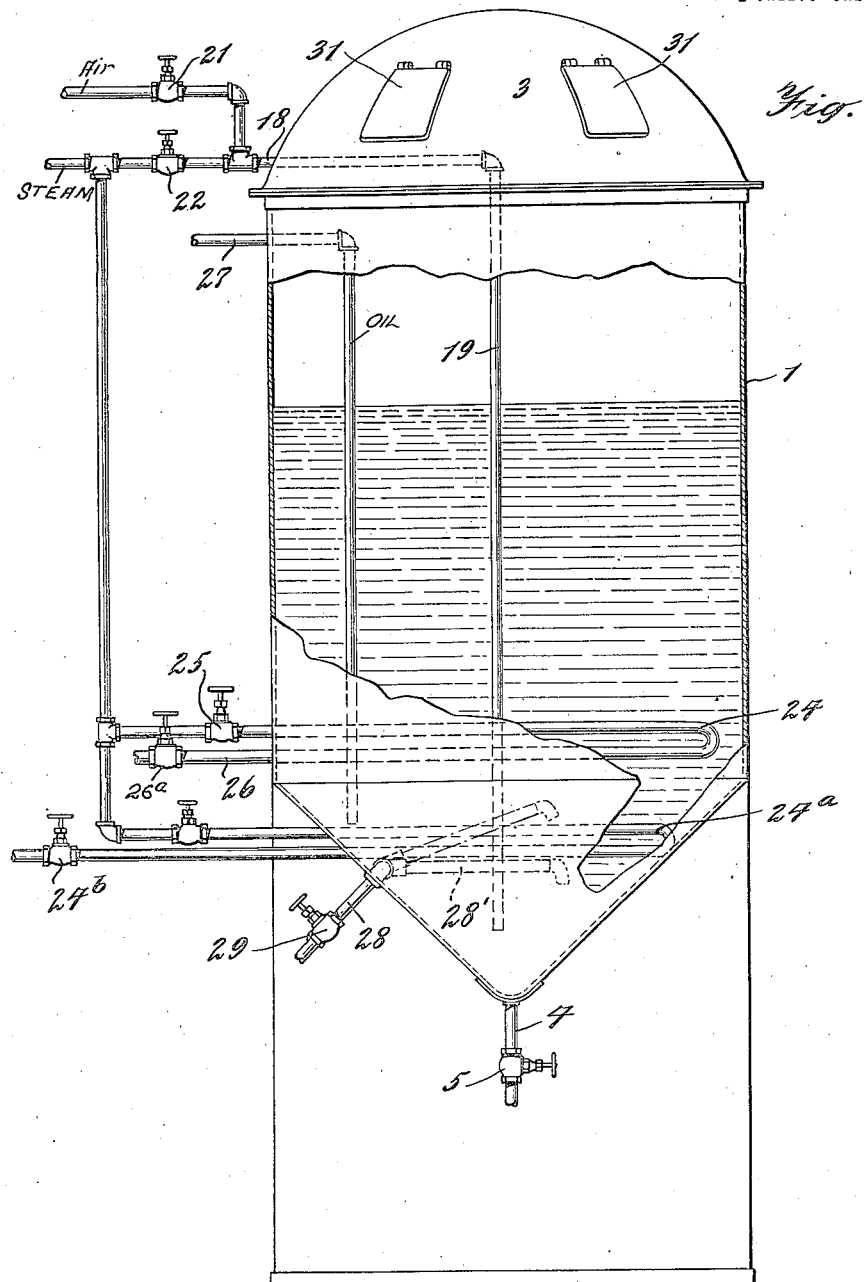

I have illustrated in the accompanying drawings two different devices with which my invention may be carried out, and in which Figure 1 is a view in side elevation, partially broken away, of an apparatus for carrying out the process when a hydroxide of an alkali metal is to be used, and Fig. 2 is a similar view showing an apparatus appropriate for carrying out the process when a hydroxide of an alkaline earth metal is used.

I will first describe the apparatus illustrated in Figure 1 of the drawings, and then the method of desulphurizing carried out thereby, after which I will describe the apparatus and the method of Fig. 2.

Referring now to the drawings, and first to Fig. 1, 1 designates a cylinder or receptacle adapted to receive the oil to be treated, and having a conical bottom 2 and a domeshaped top or cover 3, preferably provided with doors 31. The conical shaped bottom 2 is provided at its apex with an outlet pipe 4 having a valve 5 at its lowermost portion, through which pipe the contents of the cylinder may be flowed when the valve is open, as will be hereinafter described. 6 designates a receptacle or tank of any suitable construction adapted to receive the supply of chemical with which the oil is to be treated, said tank being connected by an outlet pipe 7 with the inlet side of a circulating pump 8, said pipe containing a valve 9 for cutting off and establishing flow through the same to the pump. Connected to the outlet side of the pump is a feed pipe 10 extending upwards from the pump and provided with a horizontal portion 11 entering the side of the cylinder 1 and provided at its end within the cylinder, with a depending pipe 12 having its lower end closed, but its sides perforated so as to distribute the chemical in fine streams within the cylinder to ensure proper admixture of the same with the oil contents of the cylinder. The pipe 7 is connected at a point between the valve 9 and the inlet of the pump to one end of a pipe 13, the opposite end of which is connected to the pipe 4 at a point above the valve 5, heretofore mentioned. The pipe 13 is provided with controlling valves 13ª, 14, by means of which communication through said pipe 13 to the pump is controlled. Connected at one end to the pipe 4 between the valve 5 and the point of connection of the pipe 13 is an outlet or drain pipe 15 provided with an outlet neck 16 discharging into the tank 6, heretofore described. The pipe 15 is provided with a controlling valve 17 for controlling flow therethrough.

18 designates a steam inlet pipe entering through the dome 3 and provided with a depending outlet portion 19 by means of which live steam may be admitted to the interior of the cylinder, an air inlet pipe 20 being connected with pipe 18 and provided with a valve 21, for a purpose to be presently described. The pipe 18 may be provided with a valve 22 for controlling the flow of the steam to the same to the interior of the cylinder, said pipe 20 being connected with the pipe 18 between the valve 22 and the outlet end of said pipe 18. Also connected to the steam pipe 18 is a pipe 23 leading to a closed heating coil 24, of any suitable form, located within the bottom portion of the cylinder, said coil being provided with a control valve 25 for controlling the flow therethrough. The outlet end of the steam coil is shown at 26.

The inlet pipe for feeding the oil to be treated, to the cylinder, is shown at 27, the said pipe entering the cylinder adjacent the upper portion thereof and extending to a point preferably within the area of the cone-shaped bottom. The treated oil may be withdrawn from the cylinder through an outlet pipe 28, controlled by a valve 29, said pipe being located adjacent to, but above, the lowermost portion of the cone-shaped bottom.

I do not desire to be limited in any way to an apparatus such as described, having only described the same in detail so as to ensure an adequate understanding of the process embodying my invention.

I will now proceed to describe the process of treating the petroleum oils in which hydrogen sulphide is present with hydroxides of the alkali metal group, this treatment being particularly applicable, but not necessarily confined to paraffine wax, kerosene oil, and white paraffin oil for medicinal use, and I will describe the invention for the sake of illustration for the removal of elementary sulphur from partially finished white medicinal oil.

Previous to treatment this oil may contain .03 per cent sulphur of which .02 per cent is elementary sulphur and .01 per cent is in the form of inodorous sulphur, not elementary, and in this form unobjectionable in oils for the use stated and contained in sulphur compounds left after treatment with sulphuric acid, said oil being pumped into the vessel or cylinder 1 through the pipe 27. When a sufficient amount of the oil has been charged into the receptacle 1—for instance, in practical operations, I have treated 100 barrels of 50 gallons each, when about two-thirds full—steam is admitted into the heating coil 24, and is continued until the temperature of the oil rises to a point where the chemical or chemicals to be added to the oil are active. It will be understood that this is done because chemicals, such as are employed, act slowly at normal temperatures and rapidly at higher temperatures, and, if the temperature is too low, the operation will become too tedious and, if, on the other hand, the temperature is too high, the oil may become scorched, giving rise to objectionable odor and taste. I prefer to employ a temperature between 160° F. and 190° F., which temperature will usually be reached within an hour after steam is first admitted to the heating coil, but the time depends largely upon the area of the heating coil.

While the preliminary heating of the oil is going on, the chemicals used in the treatment of the sulphur-bearing oil may be mixed in the tank 6, and for this purpose, I preferably employ the following proportions, which I have found give excellent results, but it will be understood that they may be varied as conditions and qualities of the oil may require, or may be deemed expedient, without departing from the spirit of my invention. A solution of caustic soda 158 pounds of water 458 pounds may be prepared, and the proper amount of the mixture placed in the tank 6. The amount of water added is in excess of that required to form the hydrate and impart moisture to the chemical, as a moist condition is necessary in carrying out my process. More water may be added than is indicated, but a longer time will then be necessary to complete the operation. If less water is added, the difficulty of getting a thorough and proper incorporation of oil and the treating solution is increased.

The chemical solution of the hydroxide thus prepared is pumped from the tank 6 through pipe 7 to the pump 8 and is discharged from the latter through the pipes 10, 11, and perforated spray nozzle 12, into the oil. It is important, although not essential, to have the chemical in the pipes 10, 11, and spray nozzle 12 under pressure, which will be continuous through said pipes up to the perforations in the nozzle, so that the jets of the chemical issuing from the latter will strike the oil with considerable force and effect a thorough mingling of the oil and the chemical solution.

The chemical solution injected into the oil in the manner described will gradually find its way by gravity through the body of oil to the bottom of the agitator, and, during the initial treatment, I maintain the valves 13ª, 5 and 17 closed, so that the solution, which has been partially used, will accumulate in the bottom of the agitator, and the pumping is continued until all, or the desired amount, is drawn from the tank 6 and injected into the agitator. When the desired amount of chemical solution has been fed to the oil, the valves 13ª and 14 are opened and the valves 5, 9 and 17 closed, and the pump is then operated to circulate the solution through the body of oil being treated, the pipe 13, the pump, the pipes 10, 11, and spray nozzle 12. During this circulation the temperature of the oil being treated is maintained by means of the coil 24 at a temperature of from approximately 160° F. to approximately 190° F. During the treatment described test samples of the oil are taken from time to time, said samples being washed with water and filtered through filter paper to remove the last traces of moisture, and are then placed in a test glass with a piece of bright copper and heated to about 175° F. for about one hour. When the test samples cease to show any discoloration or tarnishing of the copper, this stage of the process is considered finished. It may require from one to three hours, because the solution seems to be more active sometimes than at others, for some reason I have been unable to ascertain.

When the test samples cease to discolor the copper, as above described, the chemical solution is allowed to settle in the conical bottom of the vessel, and the settling is continued for a period of from six to ten hours in order to ensure all of the solution being separated from the treated oil. When the maximum separation of the solution is assured by adequate settling, the solution may be drawn off from the vessel and returned to the tank 6 through the pipe 4, the pipe 15, and the discharge 16, and said solution reserved for further use in the treatment of oil.

The amount of hydroxide of the alkali metal added, will of course, depend upon the amount of hydrogen sulphide present in the oil, and it can only be determined by experiment when the alkali metal has reacted with all of the hydrogen sulphide. When the hydrogen sulphide of the oil has all combined with the alkali metal, then, provided the sulphur has not all been eliminated from the oil, sulphides of the alkali metals are to be added to the oil and the oil again agitated until all of the sulphur is removed. The alkali metal sulphides suitable for this purpose may be prepared by taking the following materials and in the following proportions:

Sulphide of soda (commercial)
  $Na_2S9H_2O$ _____ 265 pounds
Caustic soda _____ 70 pounds
Water _____ 458 pounds A suitable amount of this material is placed in the tank 6 and is then pumped into the oil in the same manner as the hydroxide, and is then circulated therein in the same manner as the hydroxide, and this process may be continued for a period of from one to three hours. Samples are then taken and tested for sulphur and if any sulphur remains the process is repeated until the sulphur has all been eliminated. The chemical solution is then allowed to settle in the conical bottom of the vessel and the settling is continued for a period of from six to ten hours in order to ensure all of the solution being separated from the treated oil. When the maximum separation of the solution is assured by adequate settling, the solution may be drawn off from the vessel and returned to the tank 6 through the pipe 4, the pipe 15, and the discharge 16, and said solution reserved for further use in the treatment of oil.

I then treat the oil to remove therefrom any residual alkaline sulphide which may still be suspended in the oil. I prefer to accomplish this by treating the oil with what is known as a "still wash" either by playing water from a hand-hose onto the surface of the oil, drawing the water off continuously at the bottom of the vessel as the water may settle, or the water may be applied by pumping it through a permanent spray pipe S arranged at the top of the cylinder. This treatment may be followed up by an injection of live steam through the pipes 18, 19. This washing process, including the water wash and the steam, may extend over a period of four hours, but may be done in less or greater time, according to circumstances. Instead of injecting live steam from a boiler into the base of the receptacle, I may pump clear, pure water into the bottom of the receptacle and generate steam therefrom, while in direct contact with the oil by means of a heating coil $24^a$ similar to the coil 24. This latter method is sometimes preferable because ordinary boiler steam may contain impurities which will be detrimental to the oil being treated. The oil is then allowed to stand for about ten to twelve hours and the water is carefully drawn off and discharged to any suitable point, as, for instance, a sewer, through the pipe 4. It may be that the treated oil still shows a cloud of moisture, but this may be removed by cutting off the steam flowing through the pipes 18, 19, and injecting air from the pipe 20 into the pipes 18 and 19 and into the body of oil. This step of the process may continue for a period of from approximately one to approximately three hours, whereupon the oil is usually found bright and is considered finished.

In employing hydroxides of the alkali metals, the same are used in the form of a solution in order to obtain the best results, and the apparatus shown in Fig. 1 is well adapted for the application of the solution to the oil.

In Fig. 2 I have shown an apparatus suitable for carrying out the process in accordance with my invention when a hydroxide of an alkaline earth metal is used for treating the oil.

The apparatus here shown is the same as that shown in Fig. 1, with the exception that the pump and the connections associated therewith for introducing the chemicals to the oil are dispensed with since the alkaline earth sulphides which are used are in solid form and may be introduced to the oil in any desired manner. Furthermore, the device for introducing water into the oil for washing the same will usually be unnecessary when the hydroxides of the alkaline earth metals are used. Furthermore, the process is preferably carried out at a higher temperature than the process in which a hydroxide of an alkali metal is used, and for the purpose of bringing the metal to the desired temperature the heating coils 24 and $24^a$ are provided at their free ends with valves $26^a$ and $24^b$, respectively, which are open during the heating process just sufficient to permit the condensed water to drain from the pipes.

Material suitable for carrying out the process with a hydroxide of an alkaline earth may be prepared as follows: 800 pounds of freshly burned lime may be placed in an open pan or receptacle into which is poured 50 gallons of water, the amount of water added being just sufficient to leave the lime in the proper physical condition, neither dusty nor pasty. The amount of water added is in excess of that required to form the hydrate of lime and to impart a moist condition to the chemical. The oil is first heated up to the desired temperature, preferably above the condensing point of water, and at a temperature ranging from 212° F. to 300° F. The heating operation is carried out by means of the heating coils 24 and $24^a$, the valves $26^a$ and $24^b$ being open sufficiently to permit the condensed water to escape. When the oil has reached the desired temperature the slaked lime may be introduced to the oil through the doors 31, and steam then permitted to pass into the oil through the pipe 19 and thus agitate the oil and bring the hydroxide of the alkaline earth into thorough contact with the oil. The alkaline earth hydroxide forms with the hydrogen sulphide of the oil, sulphide of lime. After the oil has been thoroughly agitated with the calcium hydroxide for a period of from 2 hours to 6 hours, the oil is permitted to settle, and the settling will usually require one hour or less. The oil is then tested with copper to determine whether all of the elementary sulphur has been eliminated, and if elementary sulphur remains in the oil, then further hydroxide must be added and the process repeated. In case, however, all of the hydrogen sulphide present in the oil has combined with the alkaline earth hydroxide to form sulphide, and elementary sulphur still remains in the oil, then sulphides of the alkaline earth should be added to the oil and the agitation process repeated.

Alkaline earth sulphides suitable for this purpose may be prepared in the following manner: 800 pounds of freshly burned lime are placed preferably in an open pan or receptacle, into which is poured a mixture of 600 pounds of commercial sulphide of soda and 50 gallons (417 pounds) of water. As the lime slacks there is a decomposition of the sulphide of soda, thereby forming sulphide of lime and caustic soda. The amount of water added is in excess of that which is required for the reaction so that water or moisture is present in carrying out the process. The presence of moisture is desirable under all conditions to cause the alkaline sulphide which is formed as a result of the reaction between the alkaline hydroxide and the hydrogen sulphide to react with the elementary sulphur and form sulphides of a higher order. The material then is added to the oil and the agitation process continued for a period of from 2 hours to 6 hours and until all of the sulphur has been eliminated from the oil.

What I claim and desire to secure by Letters Patent of the United States is:

1. The process of removing elementary sulphur from hydrocarbon oil in which sulphuretted hydrogen is also present, which comprises converting the sulphuretted hydrogen into an alkaline sulphide and allowing such alkaline sulphide to act upon the elementary sulphur.

2. The process of removing elementary sulphur from hydrocarbon oil in which sulphuretted hydrogen is also present, which comprises converting the sulphuretted hydrogen into an alkaline sulphide and allowing such alkaline sulphide to act upon the elementary sulphur, while applying heat.

3. The process of removing elementary sulphur from hydrocarbon oil in which sulphuretted hydrogen is also present, which comprises converting the sulphuretted hydrogen into an alkaline sulphide and allowing such alkaline sulphide to act upon the elementary sulphur, while maintaining a temperature of 160° F. to 190° F.

4. The process of removing elementary sulphur from hydrocarbon oil in which sulphuretted hydrogen is also present, which comprises converting the sulphuretted hydrogen into an alkaline sulphide and allowing such alkaline sulphide to act upon the elementary sulphur, while agitating the oil.

5. The process of removing elementary sulphur from hydrocarbon oil in which sulphuretted hydrogen is also present, which comprises converting the sulphuretted hydrogen into an alkaline sulphide by means of an alkaline hydroxide and allowing such alkaline sulphide to act upon the elementary sulphur.

6. The process of removing elementary sulphur from hydrocarbon oil in which sulphuretted hydrogen is also present, which comprises converting the sulphuretted hydrogen into an alkaline sulphide by means of a solution of sodium hydroxide and allowing such alkaline sulphide to act upon the elementary sulphur.

7. The process of removing elementary sulphur from hydrocarbon oil in which sulphuretted hydrogen is also present, which comprises converting the sulphuretted hydrogen into an alkaline sulphide by means of sodium hydroxide 158 parts to which 458 parts of water are added, and allowing such alkaline sulphide to act upon the elementary sulphur.

8. The process of removing elementary sulphur from hydrocarbon oil in which sulphuretted hydrogen is also present, which comprises converting the sulphuretted hydrogen into an alkaline sulphide by means of an alkaline hydroxide and allowing such alkaline sulphide to act upon the elementary sulphur while applying heat.

9. The process of removing elementary sulphur from hydrocarbon oil in which sulphuretted hydrogen is also present, which comprises converting the sulphuretted hydrogen into an alkaline sulphide by means of an alkaline hydroxide and allowing such alkaline sulphide to act upon the elementary sulphur while maintaining a temperature of 160° F. to 190° F.

10. The process of removing elementary sulphur from hydrocarbon oil in which sulphuretted hydrogen is also present, which comprises converting the sulphureted hydrogen into an alkaline sulphide by means of an alkaline hydroxide and allowing such alkaline sulphide to act upon the elementary sulphur while maintaining a temperature of 160° F. to 190° F. and finally separating the sludge thus formed, from the oil.

11. The process of removing elementary sulphur from hydrocarbon oil in which sulphuretted hydrogen is also present, which comprises converting the sulphuretted hydrogen into an alkaline sulphide by means of a sodium hydroxide solution and allowing such alkaline sulphide to act upon the elementary sulphur while maintaining a temperature of 160° F. to 190° F. and finally separating the sulphide sluge thus formed, from the oil.

12. The process of removing elementary sulphur from hydrocarbon oil in which sulphuretted hydrogen is also present, which comprises converting the sulphuretted hydrogen into an alkaline sulphide and allowing such alkaline sulphide to act upon the elementary sulphur and then adding an alkaline sulphide to react upon any elementary sulphur yet present.

13. The process of removing elementary sulphur from hydrocarbon oil in which sulphuretted hydrogen is also present in an amount insufficient when treated with an alkaline hydroxide to form the requisite amount of alkaline sulphide to remove all free sulphur which comprises converting the sulphuretted hydrogen into an alkaline sulphide by means of an alkaline hydroxide and allowing such alkaline sulphide to act upon the elementary sulphur and then adding an alkaline sulphide sufficient in amount to react with all of the remaining elementary sulphur.

14. The process of removing elementary sulphur from hydrocarbon oil in which sulphuretted hydrogen is also present in an amount insufficient when treated with an alkaline hydroxide to form the requisite amount of alkaline sulphide to remove all free sulphur which comprises converting the sulphuretted hydrogen into an alkaline sulphide by means of an alkaline hydroxide and allowing such alkaline sulphide to act upon the elementary sulphur and then adding an alkaline sulphide sufficient in amount to react with all of the remaining elementary sulphur, the entire process being carried out at a temperature of from 160° F. to 190° F.

In testimony whereof I have hereunto signed my name in the presence of two subscribing witnesses.

ERNEST B. COBB.

Witnesses:
ADELE S. EBERHARDT,
DAVID L. WOOD.